United States Patent
Vanheerden et al.

(10) Patent No.: US 8,676,384 B2
(45) Date of Patent: Mar. 18, 2014

(54) BUILDING MANAGEMENT SYSTEM WITH ACTIVE BUILDING SKIN, AN ENVIRONMENTAL RESOURCE COLLECTOR FOR USE IN SUCH A SYSTEM AND A METHOD OF MANAGING RESOURCES USED IN A BUILDING

(75) Inventors: Clive Vanheerden, London (GB); Kyriakos Mama, London (GB); Thomas Duester, Eindhoven (NL); Christoph Dobrusskin, Eindoven (NL)

(73) Assignee: Koninklijke Philips N.V., Eindhoven (NL)

( * ) Notice: Subject to any disclaimer, the term of this patent is extended or adjusted under 35 U.S.C. 154(b) by 548 days.

(21) Appl. No.: 12/680,227

(22) PCT Filed: Sep. 29, 2008

(86) PCT No.: PCT/IB2008/053958
§ 371 (c)(1),
(2), (4) Date: Nov. 9, 2010

(87) PCT Pub. No.: WO2009/044329
PCT Pub. Date: Apr. 9, 2009

(65) Prior Publication Data
US 2011/0046789 A1 Feb. 24, 2011

(30) Foreign Application Priority Data
Oct. 1, 2007 (EP) .................................. 07117597

(51) Int. Cl.
*G01M 1/38* (2006.01)
(52) U.S. Cl.
USPC ............... 700/275; 700/28; 700/90; 700/286

(58) Field of Classification Search
USPC .............. 700/28, 90, 275, 286, 287; 60/641; 290/52–55; 126/600; 136/246
See application file for complete search history.

(56) References Cited

U.S. PATENT DOCUMENTS

| | | | | |
|---|---|---|---|---|
| 4,034,735 A | * | 7/1977 | Waldrip | 126/576 |
| 4,187,123 A | * | 2/1980 | Diggs | 136/206 |
| 5,394,016 A | * | 2/1995 | Hickey | 290/55 |
| 6,372,978 B1 | | 4/2002 | Cifaldi | |
| 7,246,492 B2 | * | 7/2007 | Hendrix et al. | 60/641.8 |
| 7,612,735 B2 | * | 11/2009 | Essig et al. | 343/915 |
| 7,937,955 B2 | * | 5/2011 | Tsao | 62/6 |
| 8,112,996 B2 | * | 2/2012 | Penciu | 60/641.15 |

(Continued)

FOREIGN PATENT DOCUMENTS

| | | |
|---|---|---|
| CN | 1687670 A | 10/2005 |
| DE | 19735281 A1 | 2/1999 |

(Continued)

*Primary Examiner* — Mohammad Ali
*Assistant Examiner* — Ziaul Karim (57) ABSTRACT

A building management system (100) comprises a measurement system for measuring a demand for resources inside the building and a collecting system for harvesting natural resources available outside the building. The building management system is further provided with a storage system for storing surplus resources and a sensor system (112,114,116, 118,120) for measuring resource availability outside the building and/or resources stored in the storage system. Further, a controller (102) arranged to receive data from the measurement system, the sensor system and the storage system is provided. The controller controls the collecting system based on said data to tune the collection of resources by the collection system to a present and/or an expected demand for resources.

23 Claims, 4 Drawing Sheets

(56) References Cited

U.S. PATENT DOCUMENTS

| | | |
|---|---|---|
| 2002/0083946 A1 | 7/2002 | Karni et al. |
| 2004/0237960 A1* | 12/2004 | Liu et al. .................. 126/628 |
| 2005/0126560 A1* | 6/2005 | Litwin ...................... 126/683 |
| 2005/0133090 A1* | 6/2005 | Couturier ................. 137/236.1 |
| 2005/0234596 A1* | 10/2005 | Rietschel ................. 700/276 |
| 2006/0033674 A1* | 2/2006 | Essig et al. .............. 343/912 |
| 2006/0159043 A1 | 7/2006 | Delp et al. |
| 2008/0308093 A1* | 12/2008 | Gianasso et al. ........ 126/622 |
| 2011/0232633 A1* | 9/2011 | Lima ........................ 126/628 |

FOREIGN PATENT DOCUMENTS

| | | | | |
|---|---|---|---|---|
| DE | 102005028863 A1 | | 1/2007 | |
| DE | 102005038490 A1 | | 2/2007 | |
| DE | 102007017990 A1 | * | 10/2008 | ............ F24J 2/16 |
| FR | 2472093 A1 | | 6/1981 | |
| WO | 0055549 A1 | | 9/2000 | |
| WO | WO 2010098656 A2 | * | 9/2010 | ............ F03D 1/04 |

* cited by examiner

BUILDING MANAGEMENT SYSTEM WITH ACTIVE BUILDING SKIN, AN ENVIRONMENTAL RESOURCE COLLECTOR FOR USE IN SUCH A SYSTEM AND A METHOD OF MANAGING RESOURCES USED IN A BUILDING

The present invention relates to a building management system comprising an active building skin and an environmental resource collector for use in such a system. In particular the present invention relates to a building management system that is constructed and arranged to balance the required resources inside a building with the available resources outside and/or inside the building, using an active building skin that can harvest available environmental resources such as air/wind, water and solar energy.

Issues like global warming, rising costs of energy and its production, overpopulation stress the need to conserve energy and/or to utilize more natural available energy resources.

Recent legislation, aimed at cutting greenhouse gas emissions in line with global commitments such as the Kyoto Accord for example, will (likely) increase scrutiny of building envelope performance of buildings all over the world. It is believed that buildings in Europe for example account for a third of the energy use by European Union Countries. That energy consumption, and more in particular a reduction thereof, has been the subject of study and attention over the last years, as buildings offer great opportunities for reducing the energy required to run them.

As the building envelope is the main boundary between the inside of a building where the main part of energy consumption takes place and its environment, it is also the main boundary between the resources required and used inside a building and the available resources outside the building such as the public utility grid and natural resources such as wind, light and water. Many studies and developments have been aimed at the building envelope, in particular in improving its thermal properties with respect to isolation to reduce the loss of heat. Alternatively, other developments are aimed at using the envelope in the process of energy production by using photovoltaic cells for example, in an attempt to reduce the demand on the public electricity grid. Another example of the use of environmental resources is the collection of precipitation such as rain water that can be stored and used for example for flushing toilets or cooling by evaporation in air treatment systems. This can reduce the demand for fresh water from the public water grid.

Recent developments are aimed at combining the options that are available for conserving energy by making buildings more energy efficient and for using the building envelope to harvest the available (natural) resources outside the building to satisfy the need for such resources inside buildings. In such developments building management systems play a role.

A building management system for controlling and monitoring various building devices such as, air-conditioning, lighting, temperature, humidity etc. is for example know from United States patent publication US 2006/0159043. The building management or control and information system as disclosed in US 2006/0159043 comprises a system that includes a utility monitoring and/or control system to control the building utilities such as electricity, water, gas etc., through metering devices that allow demand side utility management through the controlled equipment. The known building management system is directed to obtaining savings in energy and thus money for the users of the building by a more efficient use of the controlled equipment.

Another approach to building management systems and the more efficient use of energy in buildings can be found in the concept of so-called zero energy buildings or off-the-grid buildings. Such buildings are designed in such a way that they do not, or only to a very limited extend, rely on the public utility grid. Instead, such buildings use more advanced building technologies such as better insulation, heat pumps, solar energy to provide and/or conserve the required resources. Such buildings may for example be built with the underlying philosophy that the outer shell or skin of a building can be used as an active manipulator of the external elements or resources outside the building. Such an active building skin can actively modify energy flows through the building envelope by regulation, enhancement, attenuation, rejection or entrapment (see: tech.plym.ac.uk/soa/arch/intel2.htm available through the Internet). Mainly, such buildings employ photo-voltaic cells which actively convert light into electric energy. An example of such a photo-voltaic system is for example described in wbdq.org/design/bipv.php available through the Internet.

Apart from using photo-voltaic cells to convert light into electrical energy, solutions to harvest wind as an environmental resource are also described in the prior art. An example of such a system is disclosed in DE102005038490, where a building is shown that comprises an outer wall cavity having an air inlet to a wind-powered paddle wheel. The paddle wheel is linked to an electrical generator in order to generate electrical energy.

Further, from BG109049 it is known that water can also be collected from the outside of a building and can be stored.

Although the known building management systems and the associated devices that can to a certain extent tap into the available resources and can assists in reducing the demand on the public grid, the associated buildings provided with the known systems still are to at least some extent dependent on the public grid. Hence, a need exists to make buildings substantially off-the-grid, i.e. buildings that mainly rely on natural resources available outside such buildings for their demand for resources.

It is therefore an object of the present invention to provide a solution in achieving the goal of making a building substantially off-the-grid.

Another object of the present invention is to provide at least an alternative for existing building management systems that are mainly aimed at reduction of consumption of resources in a building.

These objects are achieved by the present invention, in that it provides a building management system that comprises a measurement system constructed and arranged to measure a demand for resources inside the building, and a collecting system constructed and arranged to harvest resources available outside the building. The building management system is further provided with a sensor system constructed and arranged to measure resource availability outside the building.

Preferably, the building management system is provided with a storage system constructed to store surplus harvested resources, whereby the sensor system is constructed to also measure resources stored in the storage system and supply data relating thereto to the controller.

Further, a controller arranged to receive data from the measurement system, the sensor system and the storage system is provided, wherein the controller is further arranged to control the collecting system based on said data to tune the collection of resources by the collection system to a present and/or an expected demand for resources.

With the system according to the invention a fully integrated system is provided that is capable of harvesting natural resources in response to a demand therefore, while also being capable of storing the harvested resources for later use rendering the building that is provided with the system according to the invention substantially off-the-grid. Furthermore, with the building management system according to the invention it is now possible to control the collecting system based on the measured data to at least balance the present demand for resources with the resources outside the building and/or in the storage system.

In an advantageous embodiment of the invention the building management system comprises energy conversion means constructed and arranged to convert the energy contained in the harvested resources into another form of energy under control of the controller so as to meet the demand for resources. This will enable the system to better balance the demand for resources with the available resources. An example is solar energy that can be either used to produce electrical energy or can provide heat.

In a further advantageous embodiment of the invention the collecting system comprises an assembly of collectors mounted on the outside of the building and is arranged to harvest one or more of the group of resources consisting of solar energy, precipitation, wind energy and temperature differences between the building and its surroundings. In this way the outer perimeter of the building is used to tap into the available resources.

In yet another advantageous embodiment of the invention the collectors are moveably constructed and are associated with drive means, said drive means being under control of the controller, wherein the drive means are constructed to change a position and/or an orientation of the collectors with respect to the building. This will enable to optimally use the collectors by ensuring that the collectors are always ideally oriented with respect to the resource to be harvested.

Additionally, the building management system according to the invention may comprise a memory capable of storing information on a usage pattern of the building, said information being available to the controller, and may also be connectable a weather forecasting system. Such information can be used in matching resources and usage over time by the system by anticipating usage and harvesting resources at a moment different from the moment of demand.

In a preferred embodiment of the invention the collectors of the collecting system are shaped as funnels that extend from the outside of the building and having the wide part of the funnel directed away from the building. Such a funnel or trumpet-shaped collector is particularly suitable to harvest multiple resources simply because of its shape that allows it to be directed accurately and is in particularly suitable for harvesting flowing resources such as precipitation and wind.

According to another aspect of the invention there is provided an environmental resource collector which comprises a substantially funnel-shaped main body. The main body is open at both the wide part and narrow part thereof, providing a passage for environmental resources from the wide part to the narrow part of the main body. The specific funnel shape of the resource collector makes it particularly suitable to harvest wind and precipitation, in particular rain, due to its shape. The wider part allows for a maximized area to collect said resources, whereas the gradual reduction in diameter that is associated with the funnel shape helps in transporting the collected wind and/or water.

According to yet another aspect of the invention there is provided a method of managing resources used in a building, comprising measuring a demand for resources inside the building, harvesting resources available outside the building using a collecting system and storing a surplus of harvested resources in a storage system. Further, the method involves measuring resource availability outside the building and/or resources stored in the storage system and supplying data relating to the demand for resources inside the building and data relating the availability of resources outside the building and in the storage system to a controller. With this data tuning the harvesting of resources by the collection system to present and/or expected demand for resources is effected, or at least balancing of the harvesting of resources with the demand therefore is achieved.

These and other aspects, characteristics and advantages of the present invention will be explained in more detail by the following description of a building management system according to the invention with reference to the accompanying drawing, in which identical reference numerals denote identical components, and in which.

Figure 1:
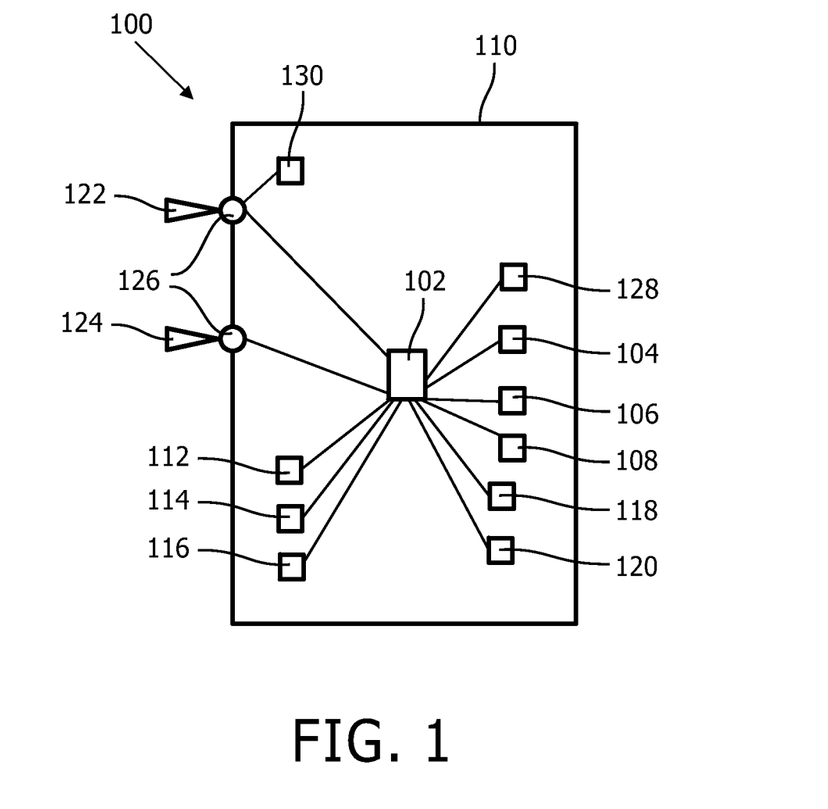
FIG. 1 schematically depicts a building provided with a building management system according to the present invention.

FIG. 1 schematically shows a building 110 that is provided with a building management system 100 according to the invention. The building management system 100 is provided with a central controller 102, which can for example be a microprocessor or any other suitable means such as a personal computer system running special software. The central controller 102 is connected to a measurement system that measures the resource consumption or demand of the building 110. In the example of FIG. 1, the measurement system is formed by three separate measurement systems denoted by reference numerals 104, 106, and 108. However, it is to be understood that this is by way of example only. In the embodiment of FIG. 1, water consumption is measured by the a first measurement system 104, electricity consumption by a second measurement system 106, and the demand for air, for example by a (non-shown) air conditioning system, by a third measurement system 108.

It is noted that the resource consumption or demand of a single consumer of a resource, for example the mentioned air conditioning system, may be impacted by different factors. The air that needs to be cooled by the air conditioning system can be cooled for example by using a refrigeration system that utilises electrical energy, or alternatively it can be cooled using an air conditioning system that operates by water evaporation. Yet another option would be to cool the air by means of harvesting air breezes around the building.

The central controller 102 is further connected to a sensor system comprising in the embodiment of FIG. 1 sensors 112, 114, 116. The sensors 112, 114, and 116 are constructed to measure the resource availability around the building. In the example of FIG. 1, sensor 112 may measure the solar energy available, sensor 114 may measure whether there is precipitation present around the building for example in the form of rain, and sensor 116 may measure if and if so, how much wind there is on the outside of the building.

The sensor system further comprises additional sensors 118, 120 which are also connected to the controller 102. Sensors 118, 120 are associated with a storage system that is capable of storing harvest resources. Sensors 118 and 120 are provided to measure such stored resources: sensor 118 measures the availability of stored electrical energy, and the sensor 120 measures the availability of stored water.

Figure 2:
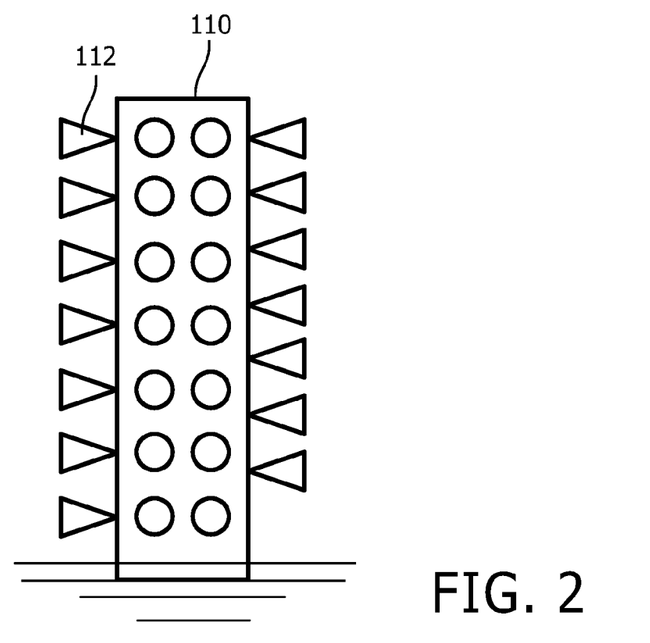
FIG. 2 schematically depicts a building provided with a larger number of collectors according to the present invention.

The building management system 100 is provided with a collecting system that is specifically designed to tap into the natural resources available outside the building 110 and comprises a number of environmental resource collectors, short collectors, or assembly of collectors 122, 124 which are mounted on the outside of the building. In FIG. 1 the collectors 122, 124 are only depicted very schematically, in particular only a very limited number of collectors is shown for reasons of clarity of the drawing only. It shall be understood by the skilled person that the building management system 100 may comprise any number of collectors that are deemed required and that the number of collectors shown in FIG. 1 are not intended to limit the scope of the present invention. As an example, a larger number of collectors 122 as mounted on the envelope of the building 110 is shown in FIG. 2, where it is noted that the size of the collectors is exaggerated for purposes of clarity.

Returning to FIG. 1, the collectors are mounted such that they occupy or form the envelope of the building. The (assembly of) collectors 122, 124 is/are arranged to harvest one or more of the group of resources consisting of solar energy, precipitation, wind energy and temperature differences between the building and its surroundings as will be explained in more detail below.

Each of the assembly of collectors 122, 124 may comprise multiple types of collectors which are specifically designed to harvest a specific environmental resource. For example, a dedicated collector or assembly of collectors may be provided that only harvest solar energy. However, the assembly of collectors may also comprise a single type of collectors that can harvest one or more resources from the environment of the building 110.

The collectors or collectors assemblies 122, 124 may influence each other. For example a collector for collecting precipitation, such as rain water or snow, may shade a neighbouring collector that is aimed at collecting solar energy. Alternatively, the collectors which are mounted on the outside or envelope of the building 110, may have an impact on the demand for resources inside the building, for example the solar energy collector may block sunlight that would normally provide illumination for a room. It is also possible that another building will cast a shadow over one or more collectors.

This interdependency or influence of other parts or buildings can be managed by controlling the collectors by means of the controller 102, for example by physically moving them, changing their shape, or changing their orientation and/or their position with respect to the building. It is even possible to change the size of the collectors, for example when the natural resource that is to be harvested requires so. This can be achieved by means of a driving means 126 that may comprise a motor and control gear. However, any other suitable driving means are also possible. The driving means 126 can adjust an individual collector 122, 124 or an assembly of several collectors to the optimal position for the task at hand, i.e. harvesting the resource, whereby the controller 102 can optimise the position, orientation, size and/or shape of the collector(s) for optimally harvesting of one or more resources. This process may be further optimized by the provision of a sub-controller 130 associated with a collector, a type of collector or a group of collectors. It is to be understood that the driving means 126 may be arranged actuate a single collector, but may also be used to actuate a group of collectors. Similarly, there may be provided one or more sub-controllers 130 per collector or several collectors are under the control of one sub-controller.

The collectors 122, 124 need not be evenly distributed across the envelope of building 110 as will be understood by the skilled person. As an example, solar energy harvesting may, for example not take place on the north face of a building standing in the northern hemisphere. Alternatively, the specific design of a building may also be used, in particular the use of inclined surfaces for the collecting of solar energy or the collection of rainwater. As another example, collectors specifically dedicated to the collection of precipitation may be located on those parts of the building envelope that over time receive, or are expected to receive, most precipitation.

The central controller 102 uses the data gathered by the measurement system 104-108 and the sensor system 112-120 to determine how to best employ the collectors by actuating the drive means 126 to at least balance the resource availability from the environment with the demand for resources of the building. However, the central controller will control the system such that the harvesting of environmental resources is tuned to at least a current demand in the building. The central controller 102 and its control over the different systems that handle the available and required resources may be further improved by providing it with a memory 128. The memory 128 can be used for collecting and storing information about the usage pattern of resources of the building, and provide this information to the controller 102 so as to better match resource harvesting and/or storage thereof and usage of resources over time. Furthermore, the memory 128 can also be linked to one or more weather forecasting services that provide future weather conditions and thus future expectations on the availability of natural resources to the memory 128 and which information is than available to the controller 102. The accuracy of the information provided by the weather forecast service could be further increased by establishing the exact location of the building, for example by means of the provision of its GPS co-ordinates or its conventional co-ordinates (longitude and latitude), and linking this to a real-time weather map.

Apart from the mentioned information, the memory 128 may also store information about the type and amount of collectors available. The controller 102 may make use of this information in matching resources and usage over time. Alternatively or additionally the collectors may communicate their type to the controller 102 for the same purpose. The controller 102 may further be capable of communicating with similar controllers of other buildings, or with other providers of resources, so as to achieve an optimum resource balance across a wider area, and not just for one building.

Figure 3:
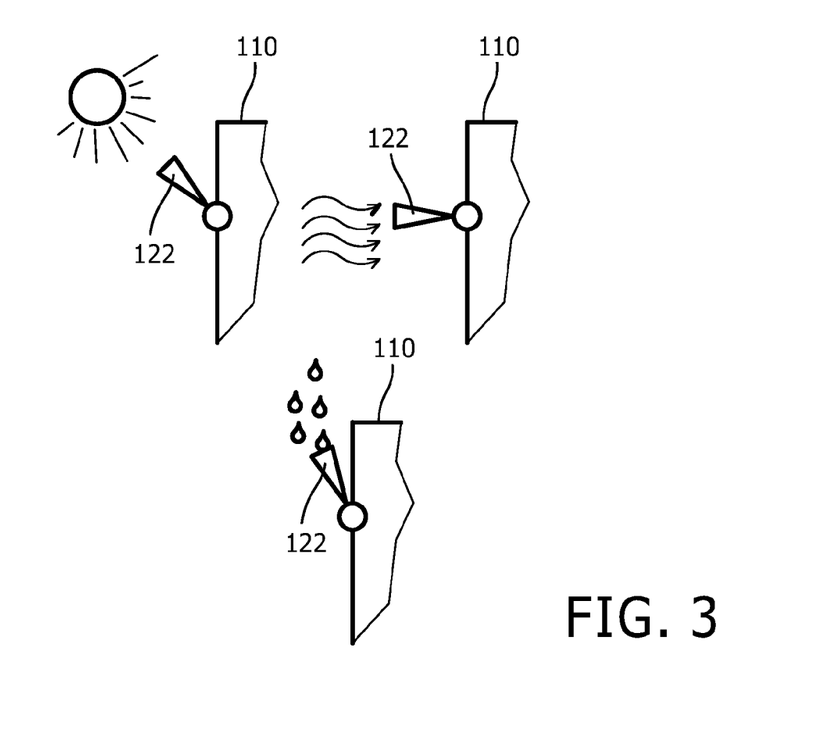
FIG. 3 schematically depicts a collector according to the invention in three different positions with respect to an envelope of a building.

As mentioned above, the collectors 122, 124 are capable of collecting different natural resources, in particular the collectors are designed to collect solar energy, i.e. light, wind energy and precipitation, in particular rain. The collection of these natural resources is further shown in FIG. 3 in which a schematic representation is given of a collector 122 in three different positions with respect to the envelope of the building 110 and in which positions a different resource is collected. As can be clearly seen in FIG. 3, the collector(s) 122 may change their orientation with respect to the envelope of building 110 in order to optimize the collection of the resource.

Figure 4:
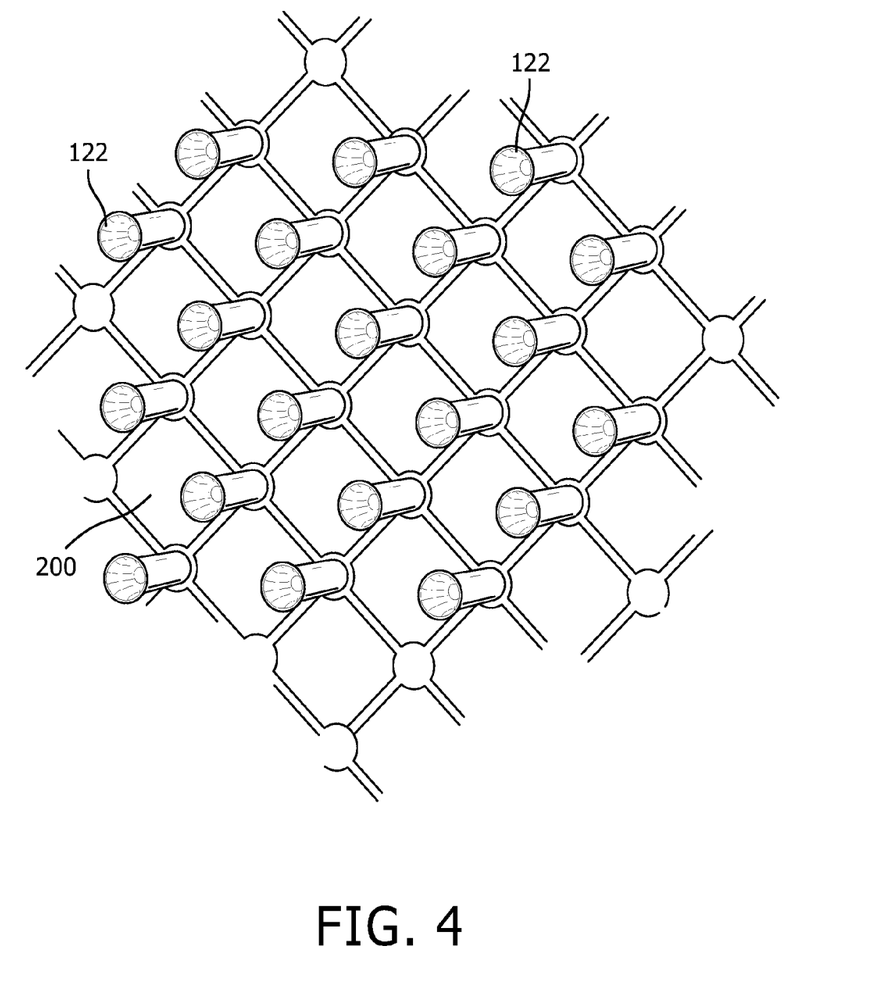
FIG. 4 schematically depicts a part of an envelope of a building having a number of collectors mounted thereon.

In FIG. 4 a small part of the envelope of the building is shown, wherein it can be seen how the collectors 122 are mounted and form an active building skin when they are under control of the central controller. From FIG. 4 the funnel shape of the collectors 122 can be clearly seen. Also it can be seen that not all collectors 122 are of the same size. Further it can be seen that the space 200 between the collectors 122 can be used as windows, so the occupants of the building can look outside and direct sunlight can still enter the building.

Figure 5:
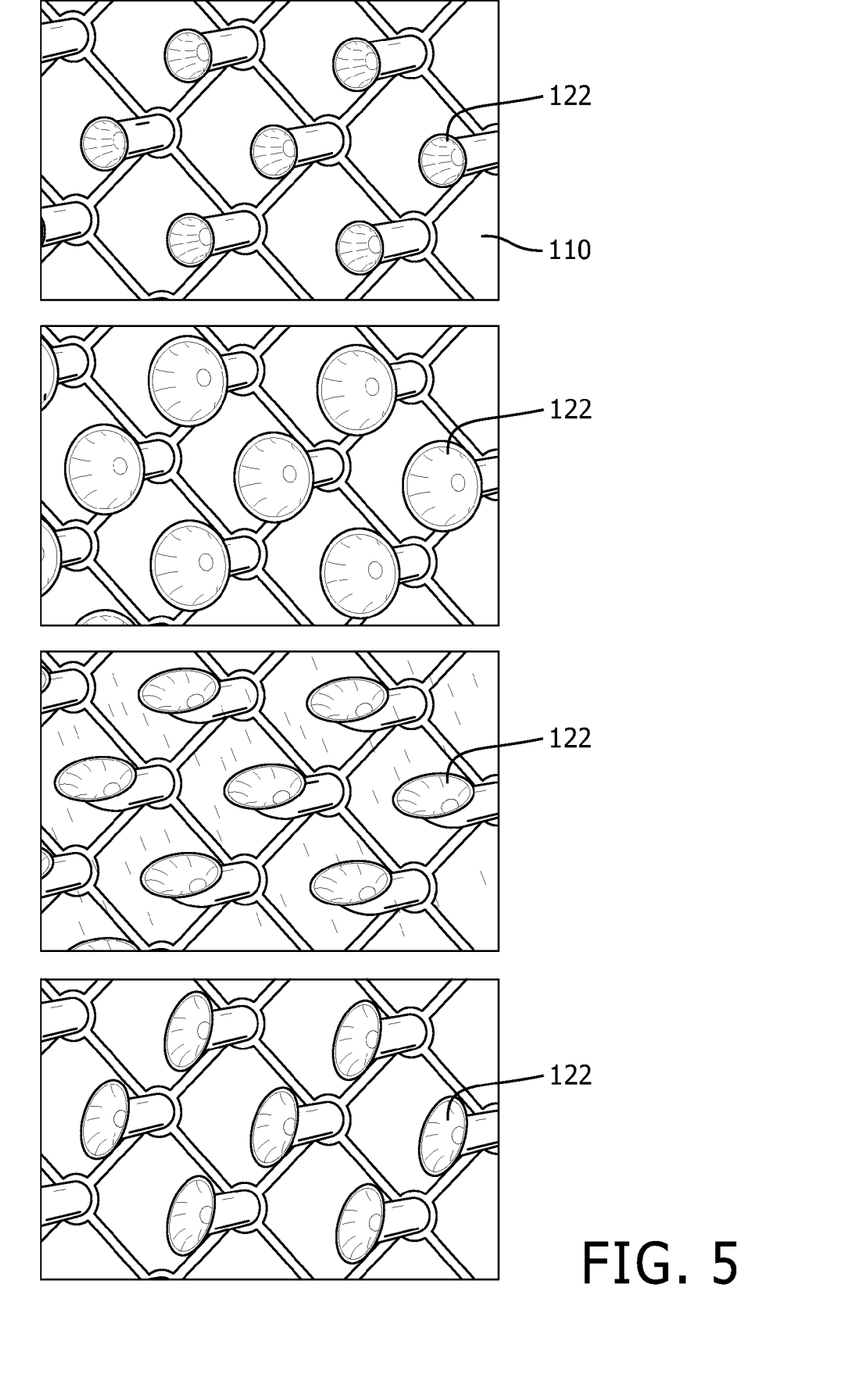
FIG. 5 is artists impression of the collectors according to the invention having four different shapes, sizes and orientations.

As a further example of the shape, size and orientation changing possibilities of the collectors, FIG. 5 is an artists impression of four different shapes, sizes and orientations of the same set of collectors. The top left picture of FIG. 5 shows the collectors 122 in their most reduced or smallest size, which may for example be an inactive state or a state in which the collectors only collect wind. In the top right picture of FIG. 5 the collectors are oriented substantially perpendicular with respect to the building 110 and the wide part of the funnel has been enlarged. This position, shape and size of the collector 122 is particularly suitable for collection wind energy. For that reason the collectors may be provided with a wind driven impeller constructed to convert wind energy into electrical energy or the collectors may be connected to a tubing assembly that transports the collected wind towards a central impeller.

In the bottom left picture the collectors, in particular the wide part of the funnel, are even further enlarged and the wide part is directed upwards. In this orientation the collectors are particularly suitable to collect rain water. In the lower right picture of FIG. 5 it can be seen that the wide part of the collector, in particular its cross-section, is not shaped as a exact circle anymore, but the lower part thereof extends somewhat further than its upper part. In this shape the collector 122 is particularly suitable to collect solar energy. For that reason the collector 122 may be provided with an inner surface that is provided with a covering of photovoltaic cells that are constructed to convert solar energy into electrical energy. However, alternatively the collectors may also or in addition comprise an inner surface that has reflective properties, so as to reflect incoming light towards a focal point. The light focused on the focal point may than further be transported, for example by further mirrored surfaces or fiberoptics.

It will be obvious to the person skilled in the art that the scope of the present invention is not restricted to the examples which have been discussed above, but rather various alterations and modifications thereto are possible without departing from the scope of the invention as defined in the appended claims.

For example, the above described building management system may also be provided with waste treatment equipment that is capable of extracting energy from the waste that is produced during use of the building. This energy can be in the form of heat for example as a direct product of incineration of the waste, or in the form of electricity when a conventional waste incineration system is coupled to a steam driven power plant. In this respect it is noted that it is also possible that any surplus energy that is produced or surplus resources that are collected by the building management system can be channeled into the public grid or can be channeled to other buildings.

As another example, the collectors are described as preferably having a funnel shape. It will be understood of course that also other shapes are possible for the collectors. This is in particularly true for those collectors that have a single resource to collect, such as collectors that are provided with photo-voltaic cells as an example, which can very well be formed as flat collectors. However, other shapes are also possible.

Further, it will be understood that it is possible to provide a single building with the inventive building management system, but that it is equally possible to put a complex of buildings under the control of a single building management system.

Finally it is noted that the above embodiments are described as having multiple collectors. It is for example also possible that an entire (side) surface of a building is covered by a large single collector.

The invention claimed is:

1. A system for using environmental resources external to a building envelope to support internal demand for utility resources in a building, the system comprising:
   a measurement system configured to measure a demand for utility resources inside the building;
   a plurality of collectors mounted on the building envelope and configured to harvest environmental resources available outside the building, wherein at least one of the plurality of collectors are shaped as funnels that extend from the building envelope with a wide part of the funnel being directed away from the building;
   a sensor system configured to measure availability of environmental resources outside the building; and
   a controller configured
   to control the harvesting of the environmental resources available outside the building based on said measured demand for utility resources inside the building and measured availability of environmental resources outside the building, and
   to tune a size of the harvest of environmental resources to a size of the measured demand for utility resources.

2. The system of claim 1, further comprising a storage system configured to store surplus harvested environmental resources, wherein the sensor system is further configured to measure availability of the surplus environmental resources in the storage system.

3. The system of claim 1, wherein the plurality of collectors comprises at least one assembly of collectors.

4. The system of claim 3, further comprising a sub-controller for locally optimizing at least one of a position and orientation of the plurality of collectors in view of the resources available outside the building.

5. The system of claim 3, wherein at least one of the plurality of collectors comprise an inner surface covered with photovoltaic cells to convert solar energy into electrical energy.

6. The system of claim 3, wherein at least one of the plurality of collectors comprise an inner surface that has reflective properties, so as to reflect incoming light towards a focal point.

7. The system of claim 3, wherein at least one of the plurality of collectors comprise a wind driven impeller to convert wind energy into electrical energy.

8. The system of claim 1, wherein the plurality of collectors is configured to harvest resources selected from one or more of solar energy, precipitation, wind energy and temperature differences between the building and its surroundings.

9. The system of claim 1, wherein the plurality of collectors comprises multiple types of collectors that are dedicated to harvesting a specific resource.

10. The system of claim 1, wherein the plurality of collectors comprises a single type of collector that can harvest one or more resources.

11. The system of claim 1, further comprising a drive configured to change at least one of a position and an orientation of at least one of the plurality of collectors with respect to the building.

12. The system of claim 1, further comprising a memory for storing information on a usage pattern of the building.

13. The system of claim 12, further comprising a weather forecasting system for storing weather forecasts in the memory.

14. The system of claim 1, further comprising a drive configured to change at least one of a position, an orientation, and the size of the wide part of the collector.

15. The system of claim 1, further comprising a dedicated sensor associated with each collector to locally measure the resource availability.

16. The system according to claim 1, wherein at least one of the plurality of collectors are mounted on the envelope of the building without obscuring windows.

17. The system of claim 1, further comprising an energy converter to convert energy of the harvested environmental resources into another form of energy.

18. The system of claim 1, wherein the plurality of collectors is part of an active building skin and is controlled by the controller.

19. The system of claim 1, wherein the system is installed in a building.

20. A method of using environmental resources external to a building envelope to support internal demand for utility resources in a building, the method comprising acts of:
measuring a demand for utility resources inside the building;
measuring availability of environmental resources outside the building; harvesting environmental resources available outside the building, using at least one collector that is shaped as a funnel that extends from the building with a wide part of the funnel being directed away from the building, based on the measurements relating to the demand for utility resources inside the building and the availability of environmental resources outside the building; and
tuning an amount of harvested resources to an amount of the measured demand for utility resources.

21. The method of claim 20, further comprising acts of:
storing a surplus of harvested environmental resources in a storage system;
measuring availability of the stored environmental resources in the storage system;
informing a controller of the measured availability.

22. A method of managing utility resources used in a building, the method comprising acts of:
measuring a demand for utility resources inside the building;
measuring availability of environmental resources outside the building;
harvesting environmental resources available outside the building, using at least one collector that is shaped as a funnel that extends from the building with a wide part of the funnel being directed away from the building, based on the measurements relating to the demand for utility resources inside the building and the availability of environmental resources outside the building; and
balancing the harvesting of environmental resources with the measured demand for utility resources.

23. The method of claim 22, further comprising acts of:
storing a surplus of harvested environmental resources in a storage system;
measuring availability of the stored environmental resources in the storage system;
informing a controller of the measured availability.

* * * * *